(12) United States Patent
Jeon

(10) Patent No.: US 6,850,629 B2
(45) Date of Patent: Feb. 1, 2005

(54) IMAGE PROCESSING METHOD FOR PREVENTING LANE DEVIATION

(75) Inventor: Yong-Won Jeon, Kyungki-do (KR)

(73) Assignee: Hyundai Motor Company, Seoul (KR)

(*) Notice: Subject to any disclaimer, the term of this patent is extended or adjusted under 35 U.S.C. 154(b) by 618 days.

(21) Appl. No.: 09/991,738

(22) Filed: Nov. 26, 2001

(65) Prior Publication Data

US 2002/0080235 A1 Jun. 27, 2002

(51) Int. Cl.$^7$ .............................................. G06K 9/00
(52) U.S. Cl. ....................... 382/104; 382/168; 382/272; 382/298; 340/934; 701/41; 701/301
(58) Field of Search ................................ 382/104, 107, 382/168, 260, 272, 298; 377/9; 348/113, 116; 180/168; 340/934, 907; 701/41, 301

(56) References Cited

U.S. PATENT DOCUMENTS

| | | | |
|---|---|---|---|
| 6,269,897 B1 * | 8/2001 | Tamura et al. .............. | 180/168 |
| 6,310,546 B1 * | 10/2001 | Seta ............................ | 340/507 |
| 6,549,642 B1 * | 4/2003 | Sakurai ....................... | 382/104 |
| 6,658,137 B1 * | 12/2003 | Yuhara et al. .............. | 382/104 |
| 6,683,969 B1 * | 1/2004 | Nishigaki et al. ........... | 382/104 |
| 2002/0195949 A1 * | 12/2002 | Starn et al. .................. | 315/82 |
| 2003/0122930 A1 * | 7/2003 | Schofield et al. ........... | 348/148 |
| 2004/0022417 A1 * | 2/2004 | Nishigaki et al. ........... | 382/104 |

* cited by examiner

*Primary Examiner*—Bhavesh M. Mehta
*Assistant Examiner*—Barry Choobin
(74) *Attorney, Agent, or Firm*—Birch, Stewart, Kolasch & Birch, LLP.

(57) ABSTRACT

An image processing method comprises the steps of generating a road image by photographing a road on which a vehicle is traveling; performing a brightness averaging process of the road image; filtering the road image having undergone the brightness averaging process to detect lane markers; performing an inverse perspective process on the filtered road image; compressing the road image having undergone the inverse perspective process; determining slope in the lane markers from the compressed road image; determining a curvature in the road from the determined slope in the lane markers; and determining a drive direction and a lane deviation of the vehicle.

3 Claims, 8 Drawing Sheets

IMAGE PROCESSING METHOD FOR PREVENTING LANE DEVIATION

CROSS-REFERENCE TO RELATED APPLICATION

This application claims priority of Korea patent Application No. 10-2000-0082965, filed on Dec. 27, 2000.

BACKGROUND OF THE INVENTION

1. Field of the Invention

The present invention relates to an image processing method, and more particularly, to an image processing method that prevents deviation from a lane by a vehicle.

2. Description of the Related Art

Various technologies are continuously being developed to improve the safety and convenience of vehicles. One such technology is a system for preventing the inadvertent deviation from a lane, which, in the case of inadvertent deviation from the lane as a result of driver carelessness, drowsiness, etc., either warns the driver or performs control to correct the positioning of the vehicle. In more detail, the lane deviation prevention system determines the location of the lane markers defining the lane the vehicle is traveling in, then determines the location of the vehicle relative to the lane markers. If the vehicle is deviating from the lane, either the driver is warned or a steering actuator is operated to make corrections to the position of the vehicle.

The main elements of a vehicle lane deviation prevention system (that provides steering control) are a photographing unit for obtaining photographs of the road on which a vehicle is traveling, an image processor for extracting from the photographs positions of the lane markers and of the vehicle relative to the lane markers, a steering controller for generating instructions as needed to make corrections in the position of the vehicle, and a steering actuator that is driven to adjust the steering of the vehicle according to the steering instructions generated by the steering controller.

In a conventional image processing method for a lane deviation prevention system, algorithms based on edges of the images are used to process the photographed images, thereby extracting the lane markers defining the lane. With this method, it is difficult to find ways in which to cope with the noise in the image data. Also, a substantial amount of time is used in image processing.

In addition to the image processing methods in which edges of the images are used, there is disclosed a method in which a gray level of images is used to extract lane markers. However, this method is error prone and performance easily varies with changes in the brightness of the images. That is, objects in the road may be mistaken for lane markers, and vehicle lane extraction proves difficult at night, on cloudy days, or when a peripheral brightness is low.

There is also a method in which color processing of images is performed. However, the camera and other equipment required are expensive with the application of this method, and the processing method is complicated such that processing times are increased.

SUMMARY OF THE INVENTION

The present invention has been made in an effort to solve the above problems.

It is an object of the present invention to provide an image processing method in which lane markers of a lane that a vehicle is driving in are precisely determined in order to prevent deviation from the lane by the vehicle.

To achieve the above object, the present invention provides an image processing method comprising the steps of generating a road image by photographing a road on which a vehicle is traveling; performing a brightness averaging process of the road image; filtering the road image having undergone the brightness averaging process to detect lane markers; performing an inverse perspective process on the filtered road image; compressing the road image having undergone the inverse perspective process; determining slope in the lane markers from the compressed road image; determining a curvature in the road from the determined slope in the lane markers; and determining a drive direction and a lane deviation of the vehicle.

According to a feature of the present invention, the method further comprises the steps of determining vehicle speed and driver intentions; and controlling steering of the vehicle based on vehicle speed, driver intentions, and an amount of lane deviation of the vehicle.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
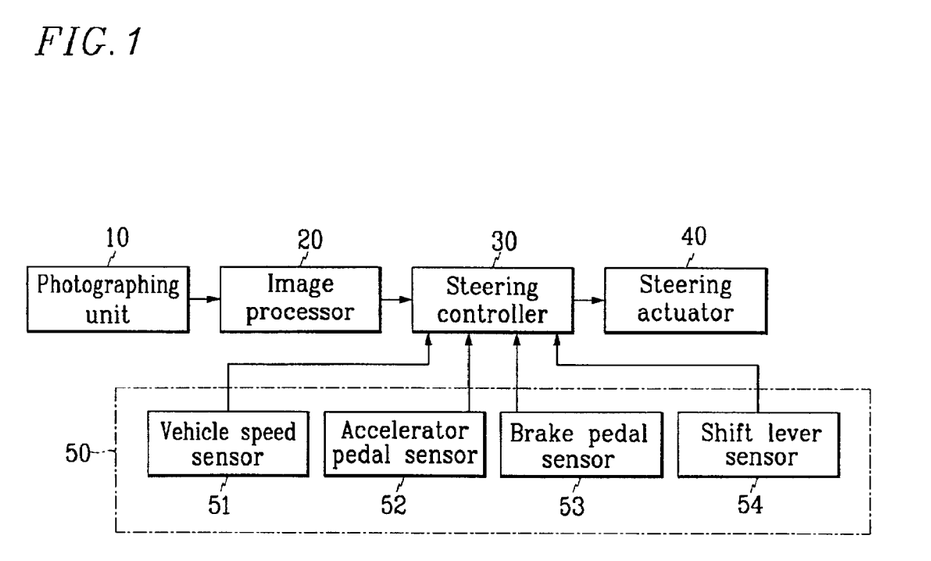
FIG. 1 is a block diagram of a lane deviation prevention system to which a method of the present invention is applied.

FIG. 1 is a block diagram of a lane deviation prevention system to which a method of the present invention is applied.

As shown in the drawing, a lane deviation prevention system includes a photographing unit 10 for obtaining photographs of the road on which a vehicle is traveling, an image processor 20 for processing the road images generated by the photographing unit 10, a steering actuator 40, and a steering controller 30 for driving the steering actuator 40 according to image processing results. The system also includes a drive state sensor 50 having a vehicle speed sensor 51 determining a speed of the vehicle, an accelerator pedal sensor 52, a brake pedal sensor 53, and a shift lever sensor 54.

The photographing unit 10 may include a photographing lens and a CCD (charge coupled device), which are mounted to enable photographing of the road in front of the vehicle. The image processor 20 processes the photographed road images to extract data of lane markers and a position of the vehicle relative to the lane markers.

The steering controller 30 drives the steering actuator 40 based on the data generated by the image processor 20 such that the vehicle is driven within the lane. To better perform this operation, the steering controller 30 also uses information provided by the drive state sensor 50, that is, vehicle speed detected by the vehicle speed sensor 51, and driver operations detected by the accelerator pedal sensor 52, the brake pedal sensor 53, and the shift lever sensor 54.

Figure 2:
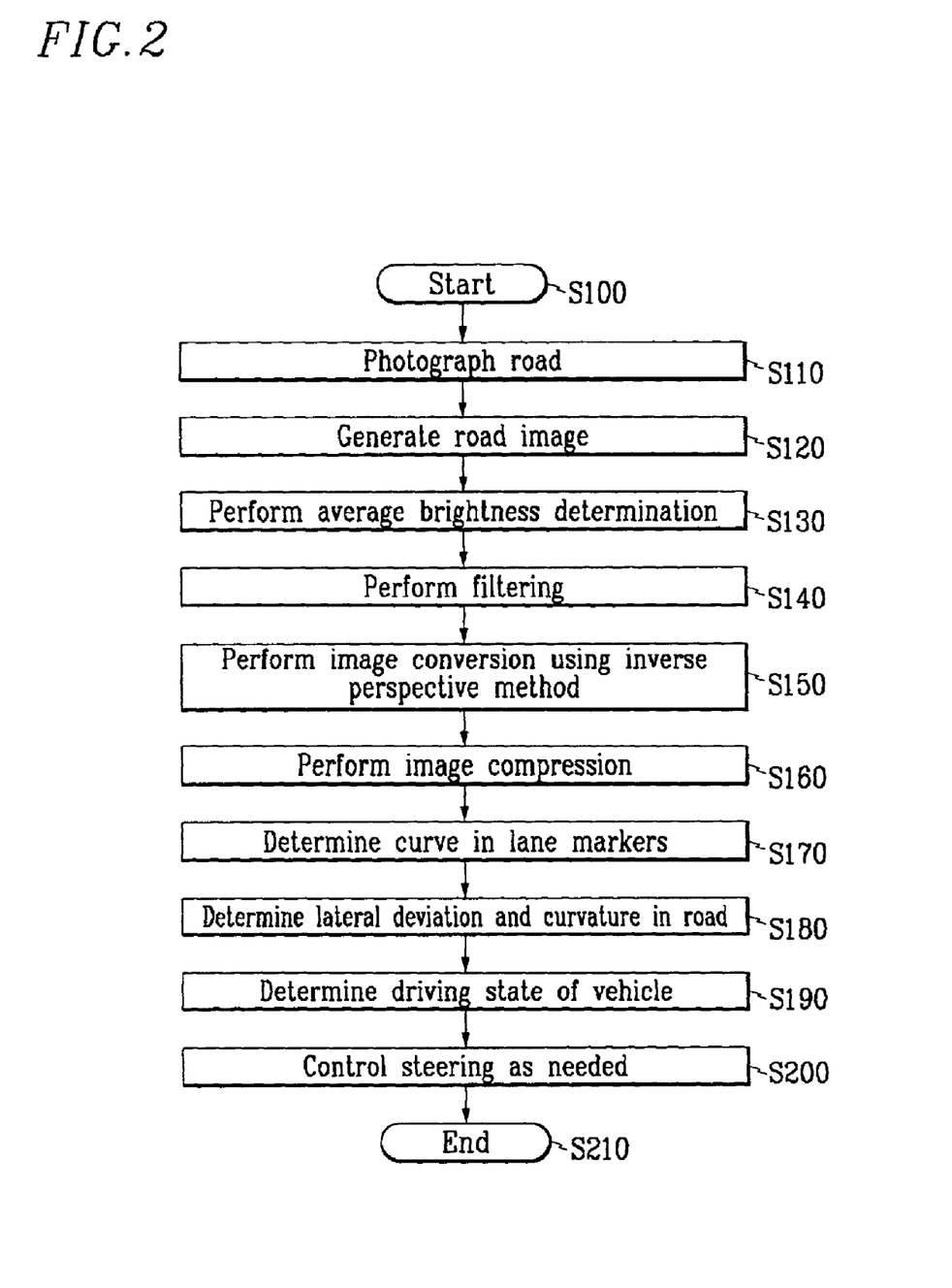
FIG. 2 is a flow chart of an image processing method for preventing lane deviation according to a preferred embodiment of the present invention.

FIG. 2 is a flow chart of an image processing method for preventing lane deviation according to a preferred embodiment of the present invention.

First, the photographing unit 10 photographs the road in front of the vehicle in step S110 and outputs corresponding electric signals to the image processor 20 in step S120. At this time, analog signals generated by the CCD of the photographing unit 10 undergo correlative double sampling to remove noise, and they also undergo signal gain before output is performed. The analog signals may also be converted to digital signals prior to output.

Following the photographing of the road by the photographing unit 10, the image processor 20 detects the lane markers in the road, and the position of the vehicle relative to the lane markers. That is, in step S130, the image processor 20 performs an average brightness determination process to remove elements from the images that may act as noise in image processing since they are too dark compared with the overall brightness of the road images. Such elements include skid marks and shadows.

In the present invention, since the lane markers are detected using their relative brightness (i.e., they have a greater brightness than the road and all other objects in the image), errors in detecting the lane markers may result if there are dark elements in the images. That is, with the presence of dark elements in the images, since portions of the road then become bright relative to the dark elements, such portions may erroneously be determined to be lane markers. Accordingly, after an average brightness value of the photographed road images is determined by the image processor 20, a brightness of portions having a value less than the average value is exchanged with the average value such that these portions are, in effect, removed from the image.

Figure 3:
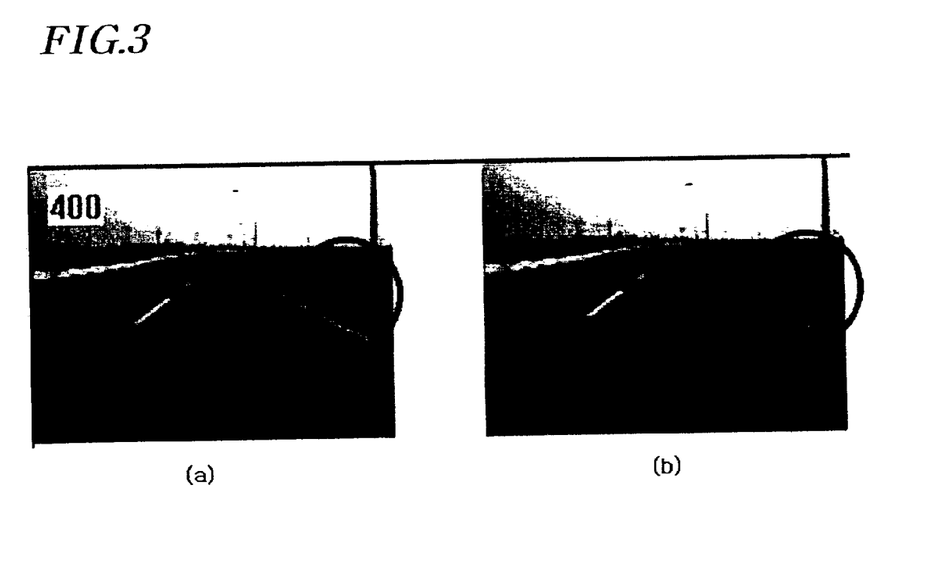
FIG. 3 shows examples of images that have undergone a brightness averaging process according to a preferred embodiment of the present invention.

FIG. 3 shows examples of images that have undergone the brightness averaging process described above.

In image (a) of FIG. 3, the circled portion is an area including portions that are less bright than the average brightness of the image. In the brightness averaging process, these portions are replaced with the average brightness such that the dark areas are effectively removed from the image as shown in image (b) of FIG. 3.

Figure 4:
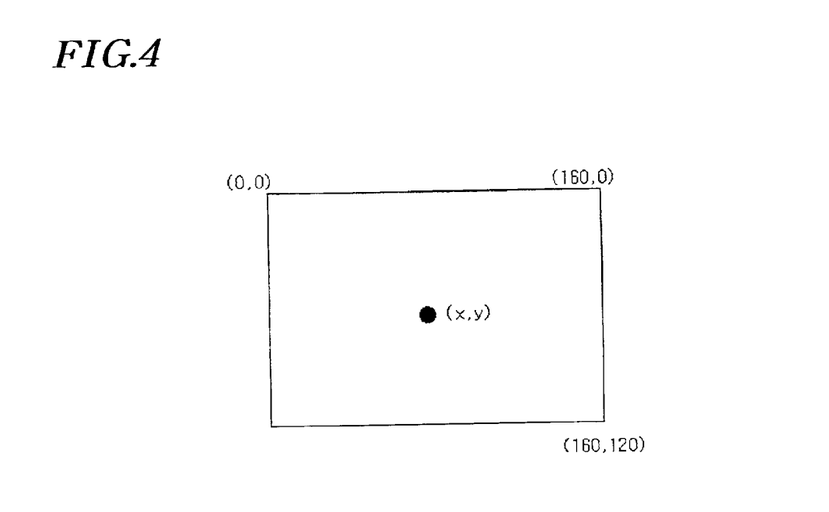
FIG. 4 is a view for describing a size of an image processed by the method of FIG. 2.

Next, the image processor 20 performs a filtering process in step S140 using the fact that a brightness value in the lane markers is higher than that outside the lane markers, For example, with reference to FIG. 4, in the case where a size of a photographed image is 160×120, if a present pixel position is set as (x,y), a brightness value at the pixel (x,y) is set as P(x,y), a filtered brightness value at the pixel (x,y) is set as F(x,y), and m is set as the width of the lane marker (in units of pixels), the following conditional equation is established.

if $P(x,y) > P(x-m, y)$ AND $P(x,y) > (x+m, y)$, then $F(x,y) = [P(x,y) - P(x-m, y)] + [P(x,y) - P(x+m, y)]$ else $F(x,y) = 0$  [Equation 1]

As is evident from Equation 1, F(x,y) increases in value as the difference in brightness between the value at the pixel (x,y) and the pixels at a distance as far away as the width of the lane marker from the pixel (x,y) increases.

Figure 5:
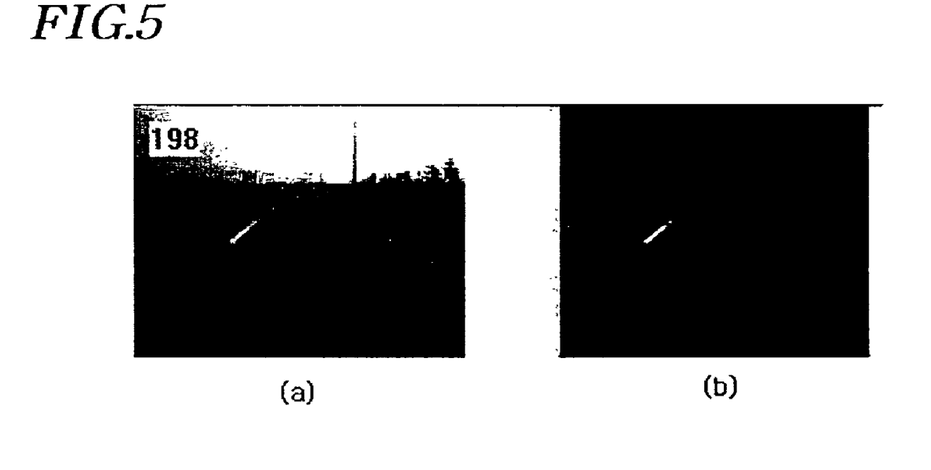
FIG. 5 shows examples of two images, in which one of the images has not undergone a filtering process while the other has according to a preferred embodiment of the present invention.

FIG. 5 shows examples of two contrasting images, view (b) that has undergone the filtering process and view (a) that has not.

Figure 6:
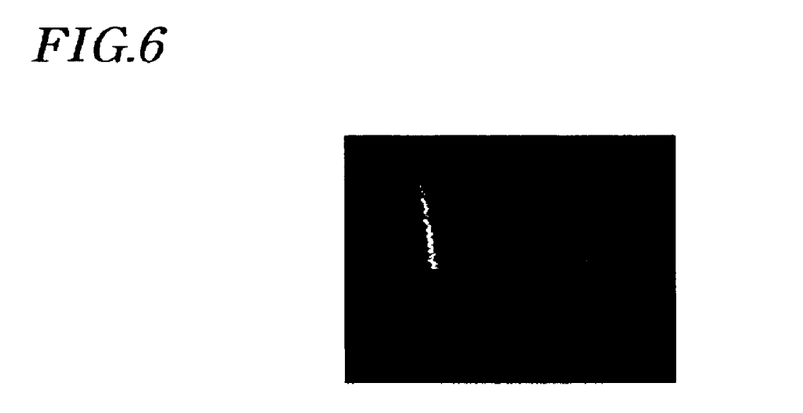
FIG. 6 shows an example of an image that has been converted into a planar image according to a preferred embodiment of the present invention.

Following the above, the image processor 20 performs an image conversion process on the filtered image using an inverse perspective method in step S150. In more detail, if it is assumed that the road is level, conversion of the original image into an identical (planar) image is performed. Since such conversion is realized using conventional geometric calculations, a detailed description thereof will not be provided. An example of an image that has undergone the conversion process is shown in FIG. 6.

Figure 7:
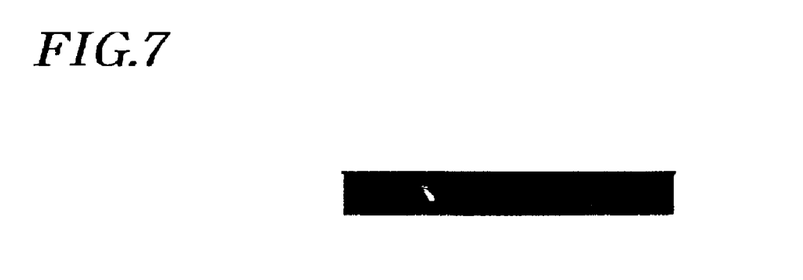
FIG. 7 shows an example of an image that has been compressed according to a preferred embodiment of the present invention.

Subsequently, the image processor 20 performs an image compression process in step S160. That is, the road image is compressed in the vertical direction to approximately one-fifth its original size so that the time required to perform calculations on the image is reduced. FIG. 7 shows an example of an image that has been compressed. Images can be reduced by differing amounts as desired.

Figure 8:
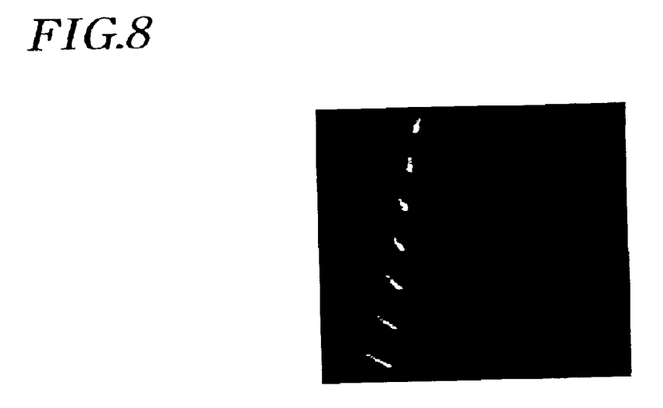
FIG. 8 shows an example of an image illustrating a slope in lane markers obtained according to a preferred embodiment of the present invention.

Following step S160, the image processor 20 determines a slope in the lane markers in step S170. The slope in the lane markers becomes a heading angle of the vehicle. In more detail, with the compressed road image slanting to the left and right, a plurality of processes are performed to obtain a function that vertically sums brightness values such that a slope in the lane markers is obtained. These steps (of which there are seven) include: determinations of whether the road image is slanting significantly to the left, slanting to the left toward a center of the image, slanting slightly to the left, positioned toward a middle, slanting slightly to the right, slanting to the right toward the center of the image, and slanting significantly to the right.

Figure 9:
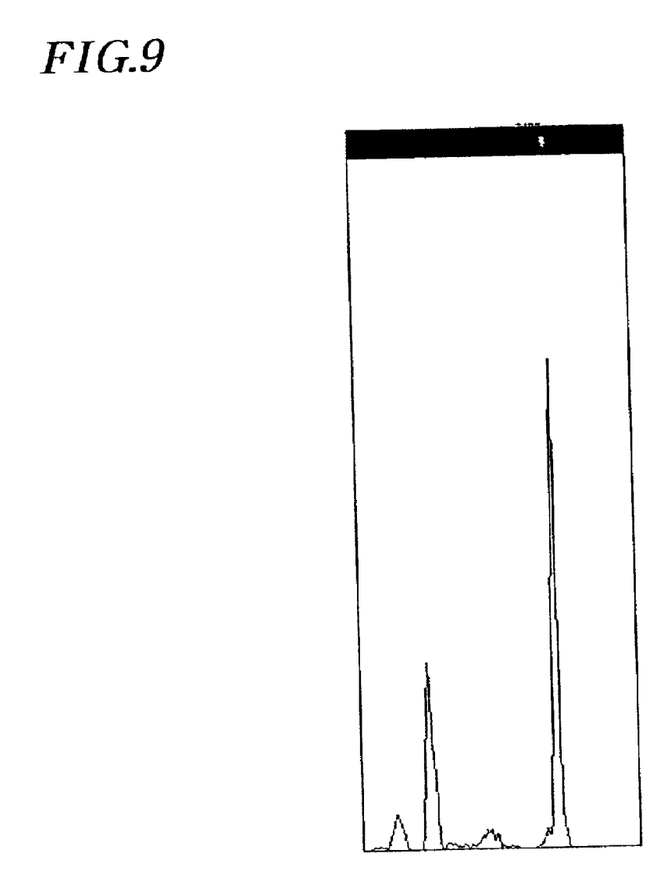
FIG. 9 is a graph showing characteristics of a reiterated function according to a preferred embodiment of the present invention.

Next, the image processor 20 determines a lateral lane deviation of the vehicle and a curvature in the road in step S180. FIG. 9 is a graph showing characteristics of a vertically reiterated function of the road image. The vertically reiterated function, which is a vertical summation of the road image, is calculated using the obtained slope in the lane markers. Also, two maximum values of the vertically reiterated function are determined. The two maximum values become an "x" position of the lane markers such that the amount of deviation from the lane can be determined.

Figure 10:
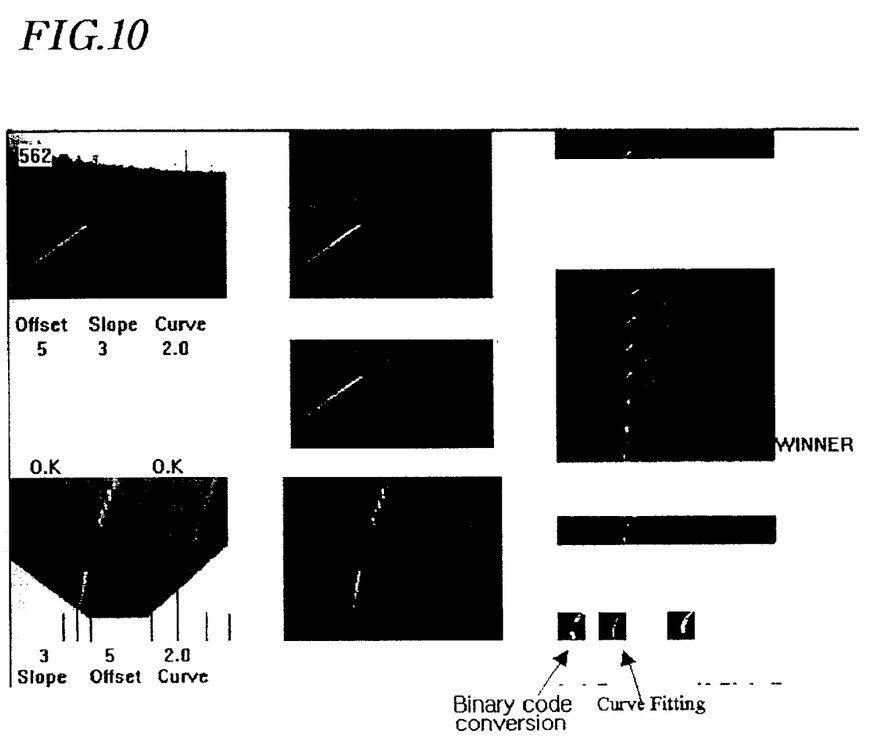
FIG. 10 shows examples of images that have undergone curve-fitting processing according to a preferred embodiment of the present invention.

The curvature in the road is then obtained. If there is a curvature in the road, the lane markers become warped as shown in FIG. 10. The degree of this warping becomes the curvature in the road. That is, the image processor 20 converts bright areas in the images to a binary code, and two-dimensional curve fitting is performed using these points such that the amount of curving in the road is obtained. A road image that has undergone curve fitting is shown in FIG. 10. Since image curve fitting is a conventional process, a detailed description thereof will not be provided.

Figure 11:
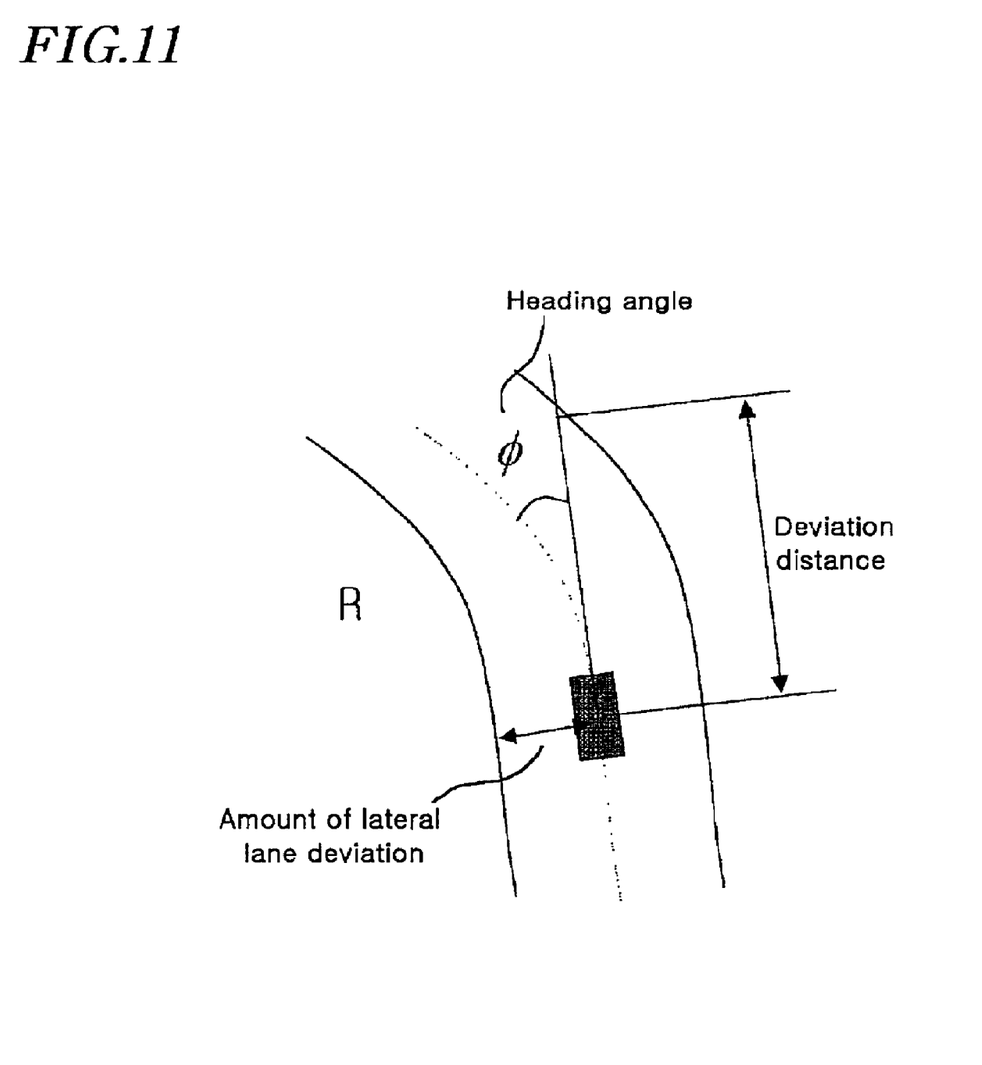
FIG. 11 is a schematic view showing an example of a lane and a vehicle traveling therein, and various variables used to analyze the lane according to a preferred embodiment of the present invention.

Next, a driving state of the vehicle is determined in step S190. That is, various variables are calculated based on the processing of the photographed road image as described above. Taken together, these variables describe the location of the vehicle. With reference to FIG. 11, the variables include the amount of road curving, driving direction, deviation amount, and deviation distance. Also, the steering controller 30 determines if the vehicle is deviating from the lane using the above data and the vehicle drive state information provided by the drive state sensor 50.

Following the above, if it is determined that lane deviation is occurring or possibly will occur, the steering controller 30 drives the steering actuator 40 such that the vehicle is positioned back in the lane or is prevented from deviating therefrom in step S200.

Figure 12:
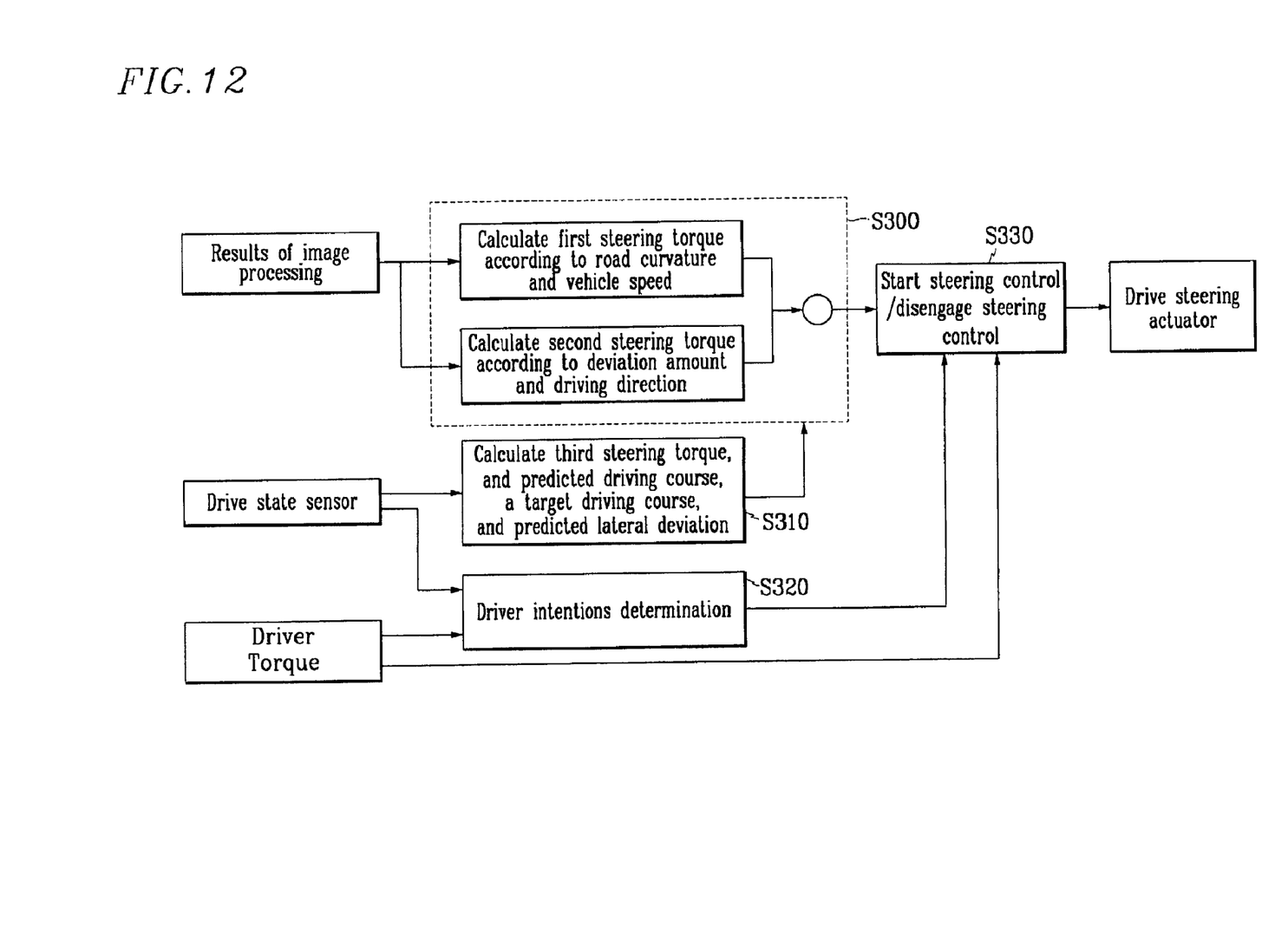
FIG. 12 is a flow chart of operations of a steering controller according to a preferred embodiment of the present invention.

FIG. 12 shows a flow chart of operations of the steering controller 30.

The steering controller 30 calculates a first steering torque according to the road curvature determined by the image processing process and according to vehicle speed output by the drive state sensor 50, and a second steering torque that compensates for a deviation error value according to the deviation amount and the driving direction in step S300.

Next, using the various driving data received from the drive state sensor 50, a third steering torque for following a target driving course is calculated, and also calculated are a predicted driving course, a target driving course, and a predicted lateral deviation in step S310. Subsequently, driver intentions are determined according to input by the accelerator pedal sensor 52 and the brake pedal sensor 53 of the drive state sensor.

Finally, the steering controller 30 determines whether steering control is required or must be disengaged in step S330, then drives the steering actuator 40 if it is determined that steering control is needed. The determination of whether steering control is required or must be disengaged is made based on the first, second, and third steering torques, and on the calculated predicted driving course, target driving course, and predicted lateral deviation.

In the image processing method of the present invention described above, the photographed images of the road undergo brightness averaging and filtering such that the negative affects of noise in the image in detecting lane markers are significantly minimized. Further, curves of the lane markers are precisely determined. Accordingly, the amount of deviation from the lane can be predicted from the detected driver intentions and vehicle speed such that steering control can be made to prevent lane deviation.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. An image processing method comprising the steps of:

generating a road image by photographing a road on which a vehicle is traveling;

performing a brightness averaging process of the road image;

filtering the road image having undergone the brightness averaging process to detect lane markers;

performing an inverse perspective process on the filtered road image;

compressing the road image having undergone the inverse perspective process in a vertical direction;

determining slope in the lane markers from the compressed road image;

determining a curvature in the road from the determined slope in the lane markers; and determining a drive direction and a lateral lane deviation of the vehicle.

2. The method of claim 1 wherein the brightness averaging process is realized by exchanging a brightness of portions having a value less than an average brightness value of a photographed road image with the average brightness value.

3. The method of claim 1 further comprising the steps of:

determining vehicle speed and driver intentions; and controlling steering of the vehicle based on vehicle speed, driver intentions, and an amount of lane deviation of the vehicle.

* * * * *